(12) United States Patent
Kaku

(10) Patent No.: US 10,630,609 B2
(45) Date of Patent: Apr. 21, 2020

(54) RELAY DEVICE

(71) Applicant: DENSO CORPORATION, Kariya, Aichi-pref. (JP)

(72) Inventor: Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 11 days.

(21) Appl. No.: 16/174,452

(22) Filed: Oct. 30, 2018

(65) Prior Publication Data

US 2019/0173806 A1 Jun. 6, 2019

(30) Foreign Application Priority Data

Dec. 6, 2017 (JP) .................... 2017-234432

(51) Int. Cl.
*H04L 12/931* (2013.01)
*H04L 12/42* (2006.01)

(52) U.S. Cl.
CPC ............ *H04L 49/208* (2013.01); *H04L 12/42* (2013.01)

(58) Field of Classification Search
CPC ..... H04L 12/42; H04L 12/421; H04L 12/422; H04L 12/423; H04L 12/427; H04L 12/43; H04L 12/433; H04L 12/437; H04L 49/208; H04L 2012/421
See application file for complete search history.

(56) References Cited

U.S. PATENT DOCUMENTS

2011/0299532 A1* 12/2011 Yu .................. H04L 12/4625
370/392

FOREIGN PATENT DOCUMENTS

| JP | 2000-183936 A | 6/2000 | |
| JP | 2008258846 A * | 10/2008 | ............ H04L 12/44 |
| JP | 2013-192128 A | 9/2013 | |

* cited by examiner

*Primary Examiner* — Ian N Moore
*Assistant Examiner* — Brian T Le
(74) *Attorney, Agent, or Firm* — Posz Law Group, PLC

(57) ABSTRACT

A relay device is usable as one of a plurality of relay devices providing a communication network. Each of the plurality of relay devices has a plurality of ports including at least two redundant ports. A relay device includes a determining unit, a copying unit and a selecting unit. The selecting unit is configured to compare traffics of the at least two redundant ports when the determining unit determines that a port mirroring instruction transmitted from a diagnostic device is received by any of the at least two redundant ports. The selecting unit is configured to select an output redundant port to output a mirror frame copied by the copying unit based on a comparison result among the at least two redundant ports, and output the mirror frame from the output redundant port to transfer the mirror frame to the diagnostic device.

5 Claims, 2 Drawing Sheets

RELAY DEVICE

CROSS REFERENCE TO RELATED APPLICATION

The present application claims the benefit of priority from Japanese Patent Application No. 2017-234432 filed on Dec. 6, 2017. The entire disclosure of the above application is incorporated herein by reference.

TECHNICAL FIELD

The present disclosure relates to a relay device providing a communication network.

BACKGROUND

For example, in a communication network of Ethernet, a ring type topology is formed by switches as a plurality of relay devices connected in a ring shape. Incidentally, "Ethernet" is a registered trademark. In the ring type topology, a plurality of switches is connected in a ring shape by two ports of each switch connected to ports of the other switches. The switches form two redundant transfer paths therebetween.

JP 2013-192128 A discloses to mirror (that is, copy) a frame by a port mirroring function of one of a plurality of switches providing a network, and to transmit the mirrored frame to a measuring device connected to another switch.

SUMMARY

The inventors of the present disclosure conducted detailed examination with respect to a communication network having a plurality of redundant transfer paths between a plurality of relay devices. As a result, the following issues may occur when a frame mirrored by one of the relay devices is transferred to a diagnostic device connected to another one of the relay devices.

When a mirrored frame (hereinafter, referred to as a mirror frame) and a frame to be mirrored, that is, a frame for normal communication (hereinafter, referred to as a normal frame) are output to the same transfer path, a bandwidth in the transfer path may be excessively increased. The "bandwidth" referred to here means an amount of data transferred per unit time. Also, "excessively increased" means exceeding an upper limit value of the bandwidth enabling normal communication. In this case, one or both of the mirror frame and the normal frame may be discarded due to overbandwidth. If the mirror frame is discarded, accurate diagnosis by the port mirroring is not performed. If the normal frame is discarded, normal communication is not performed.

It is an object of the present disclosure to provide a relay device capable of suppressing an excessive increase of a bandwidth in a transfer path due to port mirroring.

According to an aspect of the present disclosure, a relay device is usable as one of a plurality of relay devices providing a communication network. Each of the plurality of relay devices has a plurality of ports including at least two redundant ports. The at least two redundant ports are connected to communication lines forming redundant transfer paths between the plurality of relay devices.

According to the aspect of the present disclosure, the relay device includes a determining unit, a copying unit and a selecting unit. The determining unit is configured to determine whether a port mirroring instruction is received by any of the at least two redundant ports. The port mirroring instruction is transmitted to the relay device from a diagnostic device connected to another one of the plurality of relay devices.

The copying unit is configured to copy a normal frame when the determining unit determines that the port mirroring instruction is received by any of the at least two redundant ports. The normal frame is a mirroring target frame indicated by the port mirroring instruction to be mirrored.

The selecting unit is configured to compere traffics of the at least two redundant ports when the determining unit determines that the port mirroring instruction is received by any of the at least two redundant ports. The "traffics" referred to here means an amount of data transmitted per unit time. The selecting unit is configured to select an output redundant port to output a mirror frame copied by the copying unit based on a comparison result among the at least two redundant ports, and output the mirror frame from the output redundant port to transfer the mirror frame to the diagnostic device.

According to the relay device having such a configuration, the mirror frame is output to the diagnostic device from the redundant port having less traffic among the at least two of redundant ports. As a result, excessive increase of the bandwidth in the transfer path due to the port mirroring is suppressed.

BRIEF DESCRIPTION OF THE DRAWINGS

The above and other objects, features and advantages of the present disclosure will become more apparent from the following detailed description made with reference to the accompanying drawings in which.

DETAILED DESCRIPTION

Hereinafter, embodiments of the present disclosure will be described with reference to the drawings.

1. Configuration

Figure 1:
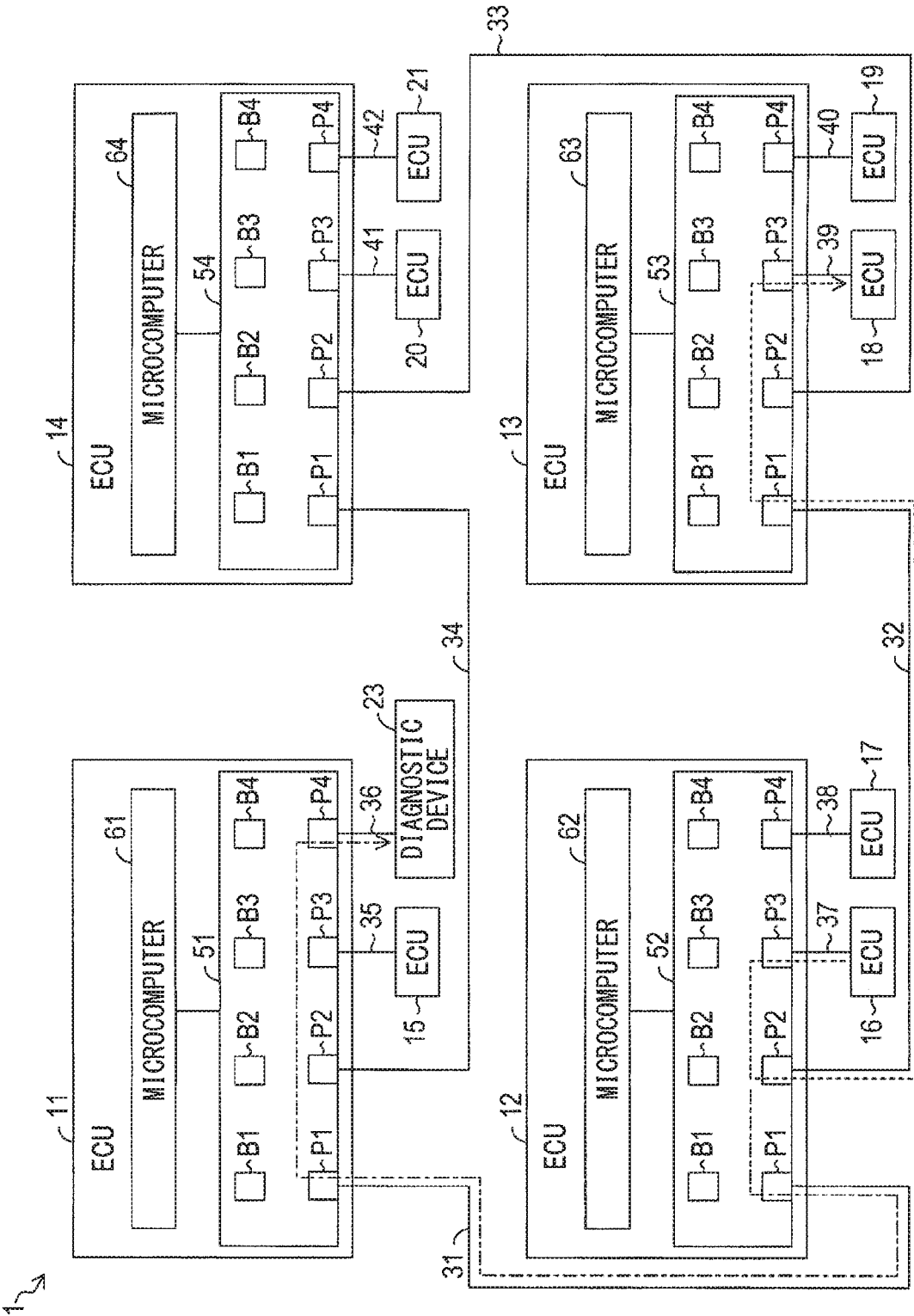
FIG. 1 is a configuration diagram showing a communication network in which a relay device according to an embodiment is used.

For example, a communication network 1 shown in FIG. 1 is an Ethernet network installed in a vehicle such as a passenger car and constitutes a communication system in the vehicle.

As shown in FIG. 1, the communication network 1 includes ECUs 11 to 21 and communication lines 31 to 42. ECU is an abbreviation of "Electronic Control Unit". The ECUs 11 to 14 respectively have Ethernet switches (hereinafter, referred to as switches) 51 to 54 as a relay device that relays communication between the other ECUs 15 to 21. The Ethernet switches are network switches of the Ethernet. Furthermore, the ECUs 11 to 14 respectively have microcomputers 61 to 64 as arithmetic devices. Although not illustrated, the microcomputers 61 to 64 include a CPU, a ROM, a RAM, and the like.

The switches 51 to 54 are, for example, layer 2 switches (i.e., L2 switches), and perform communication for relaying according to the Ethernet standard. Each of the switches 51 to 54 has a plurality of ports. For example, each of the switches 51 to 54 has four ports P1 to P4. In addition, each of the switches 51 to 54 has output frame buffers B1 to B4 for the respective ports P1 to P4. The output frame buffers B1 to B4 store frames scheduled to be output from the ports P1 to P4. The output frame buffers B1 to B4 are buffers of FIFO system.

In the communication network 1, the port P1 of the switch 51 of the ECU 11 and the port P1 of the switch 52 of the ECU 12 are connected by the communication line 31. The port P2 of the switch 52 of the ECU 12 and the port P1 of the switch 53 of the ECU 13 are connected by the communication line 32. The port P2 of the switch 53 of the ECU 13 and the port P2 of the switch 54 of the ECU 14 are connected by the communication line 33. The port P1 of the switch 54 of the ECU 14 and the port P2 of the switch 51 of the ECU 11 are connected by the communication line 34.

In other words, the switches 51 to 54 are connected in a ring shape by the ports P1 and P2 of each switch connected to the ports P1 and P2 of another switch. Therefore, the topology of the communication network 1 is a ring type topology.

In this configuration, there are two transfer paths between the switches 51 to 54. For example, when the switch 52 is regarded as a starting point, there are a counterclockwise transfer path in a direction from the switch 52 to the switch 53 and a clockwise transfer path in a direction from the switch 52 to the switch 51. The communication lines 31 to 34 correspond to communication lines forming redundant transfer paths between the switches 51 to 54. In the following description, among the ports P1 to P4 of the switches 51 to 54, the ports P1 and P2 used for the ring-shaped connection and the ports P1 and P2 forming the redundant transfer paths may be referred to as redundant ports.

The ECU 15 is connected to the port P3 of the switch 51 of the ECU 11 via the communication line 35. ECUs 16 and 17 are connected to the ports P3 and P4 of the switch 52 of the ECU 12 via the communication lines 37 and 38, respectively. ECUs 18 and 19 are connected to the ports P3 and P4 of the switch 53 of the ECU 13 via the communication lines 39 and 40, respectively. ECUs 20 and 21 are connected to the ports P3 and P4 of the switch 54 of the ECU 14 via the communication lines 41 and 42, respectively. A diagnostic device 23 is detachably connected to the communication line 36 connected to the port P4 of the switch 51 of the ECU 11.

The counterclockwise and clockwise transfer paths function as redundant transfer paths for communication between nodes connected to different switches 51 to 54. The "nodes" referred to here are the ECUs 15 to 21 and the diagnostic device 23.

For example, suppose that the ECU 16 connected to the port P3 of the switch 52 transmits a frame addressed to the ECU 18 connected to the port P3 of the switch 53. The frame addressed to the ECU 18 transmitted from the ECU 16 is referred to as a frame f16-18. The frame f16-18 includes a MAC address of the ECU 16 as a source MAC address and a MAC address of the ECU 18 as a destination MAC address.

In this case, when the switch 52 transmits the frame f16-18 received from the port P3 from the port P2, the frame f16-18 is input to the port P1 of the switch 53 via the communication line 32. Then, the frame f16-18 is transferred from the port P3 of the switch 53 to the ECU 18.

Alternatively, when the switch 52 transmits the frame f16-18 received from the port P3 from the port P1, the frame f16-18 is input to the port P2 of the switch 53 via the communication line 31, the switch 51, the communication line 34, the switch 54 and the communication line 33. Then, the frame f16-18 is transferred from the port P3 of the switch 53 to the ECU 18.

2. Processing

Next, among processing performed by each of the switches 51 to 54, a processing relating to port mirroring will be described with reference to FIG. 2. In the following description, when the switches 51 to 54 and the ports P1 to P4 are not particularly distinguished, the reference numerals may be omitted.

Figure 2:
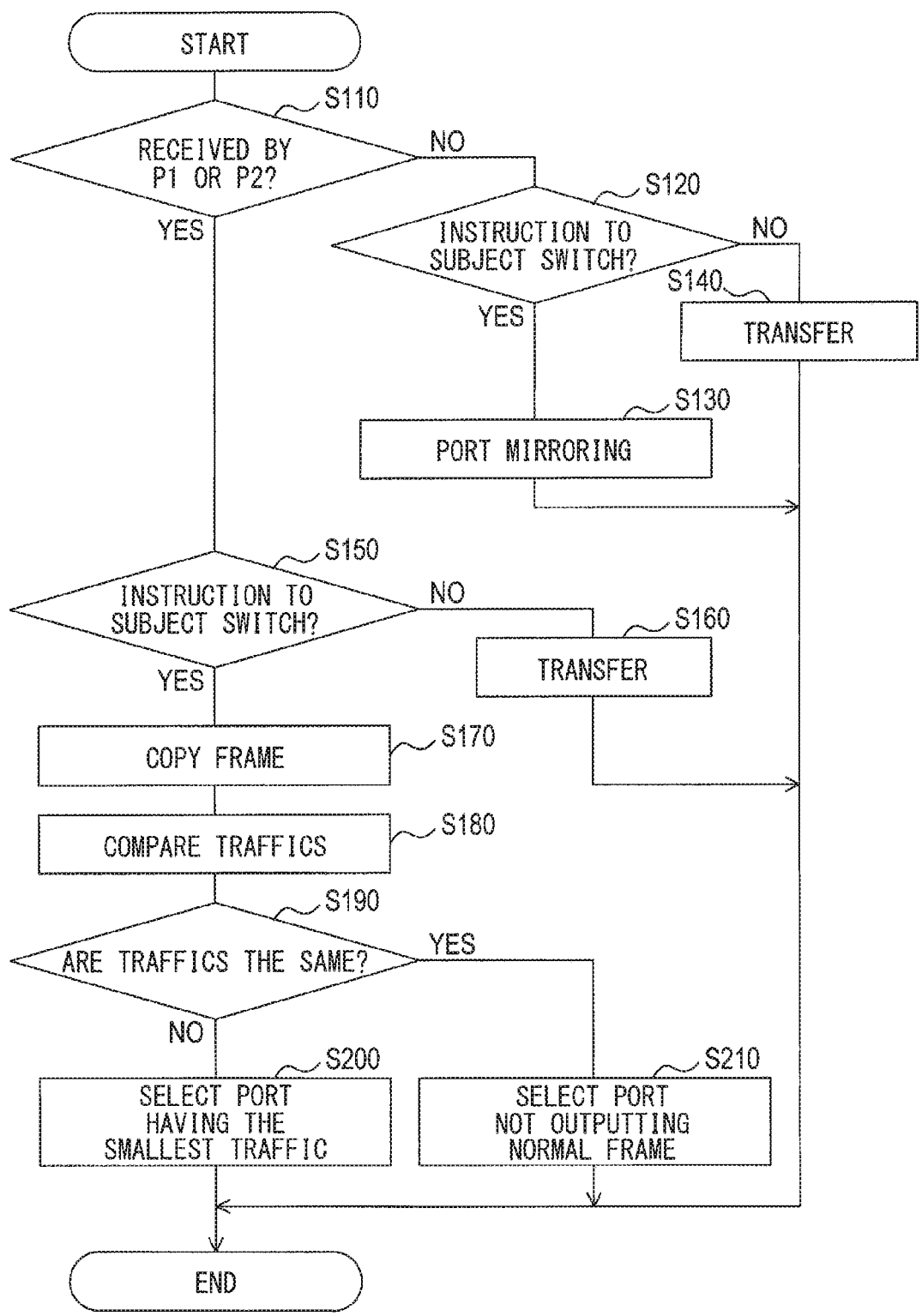
FIG. 2 is a flowchart showing a processing relating to port mirroring.

Upon receiving the port mirroring instruction transmitted from the diagnostic device 23, the switch performs the processing shown in FIG. 2. The port mirroring instruction also has the form of frame. The port mirroring instruction is a frame instructing implementation of the port mirroring. The port mirroring instruction includes destination information that can identify the destination switch. For example, the destination information may be the identification information of the switch or the identification information of the ECU connected to the destination switch.

Further, the port mirroring instruction includes information (hereinafter, referred to as a target indication information) indicating a frame to be mirrored. For example, the target indication information may indicate which frame from an ECU to another ECU to be mirrored. For example, the target indication information may specify the port and indicate that one or both of the frame to be input to the port and the frame to be output from the port is to be mirrored.

As shown in FIG. 2, the switch determines in S110 whether the port receiving the port mirroring instruction is one of the ports P1 and P2 (that is, the redundant ports). When the switch determines in S110 that the port receiving the port mirroring instruction is neither port P1 nor P2, that is, the port receiving the port mirroring instruction is one of ports P3, P4, the processing proceeds to S120. In the communication network 1 shown in FIG. 1, the switch proceeding from S110 to S120 is the switch 51 connected to the diagnostic device 23 among the switches 51 to 54.

In S120, the switch determines whether the received port mirroring instruction is a port mirroring instruction to the subject switch (i.e., the switch itself). The destination of the port mirroring instruction is specified based on the aforementioned destination information.

When the switch determines in S120 that the received port mirroring instruction is a port mirroring instruction to the subject switch, the switch performs a port mirroring processing in S130. Specifically, the switch copies the frame indicated by the target indication information in the port mirroring instruction. Then, the switch transfers the copied frame (i.e., mirror frame) to the port connected to the diagnostic device 23 (that is, the port P4). Then, upon completion of the mirroring processing, the switch ends the processing of FIG. 2.

When the switch determines in S120 that the received port mirroring instruction is not a port mirroring instruction to the subject switch, the processing proceeds to S140 and the switch performs a transferring processing to transfer the received port mirroring instruction. In the transferring processing of S140, one or both of the ports P1 and P2 are set as a port outputting the port mirroring instruction. Thereafter, the switch ends the processing of FIG. 2.

Accordingly, in the communication network 1, when the switch 51 receives the port mirroring instruction from the diagnostic device 23 to another switch (e.g., switches 52 to 54), the switch 51 transmits the received port mirroring instruction from one or both of the ports P1 and P2 in S140. Then, the port mirroring instruction output from the switch 51 is input to any of the ports P1 and P2 of the other switches 52 to 54.

When the switch determines in S110 that the port receiving the port mirroring instruction is any of the port P1 and P2, the processing proceeds to S150. In the communication network 1 shown in FIG. 1, the switch proceeding from S110 to S150 is any of the switches 52 to 54 not connected to the diagnostic device 23.

In S150, similarly to the S120, the switch determines whether the received port mirroring instruction is a port mirroring instruction to the subject switch. When the switch determines in S150 that the received port mirroring instruction is not a port mirroring instruction to the subject switch, the processing proceeds to S160 and the switch performs the transferring processing to transfer the received port mirroring instruction. In the transferring processing of S160, a port different from the port receiving the port mirroring instruction is set as a port to output the port mirroring instruction among the ports P1 and P2. Thereafter, the switch ends the processing of FIG. 2.

When the switch determines in S150 that the received port mirroring instruction is a port mirroring instruction to the subject switch, the processing proceeds to S170. The switch determines whether the port mirroring instruction to the subject switch from the diagnostic device 23 connected to another switch is received by any of the ports P1 and P2 of the subject switch according to S110 and S150.

In S170, the switch copies the frame indicated by the target indication information in the port mirroring instruction. That is, a mirror frame is created. The mirror frame includes information indicating the diagnostic device 23 as the information of the destination.

Then, in S180, the switch compares traffics of the ports P1 and P2 of the subject switch. The "traffics" referred to here means an amount of data transmitted per unit time.

Specifically, the switch compares the traffics of the ports P1 and P2 based on data occupation amounts in the output frame buffers B1 and B2 corresponding to the ports P1 and P2. The data occupation amount is an amount of data stored.

When the routes connected to the ports P1 to P4 of the switch are unoccupied, the frames stored in the output frame buffers B1 to B4 are immediately transmitted. That is, the frames are not stored in the output frame buffers B1 to B4. On the other hand, when the routes connected to the ports P1 to P4 of the switch are occupied, the transmission of the frames stored in the output frame buffers B1 to B4 are held (i.e., transmission wait state). That is, the frames are stored in the output frame buffers B1 to B4. Therefore, the data occupation amounts in the output frame buffers B1, B2 and the traffics of the ports P1, P2 are correlated.

The switch compares the data occupation amounts in the output frame buffers B1 and B2 as the traffics of the ports P1 and P2 in S180. That is, the switch may be configured to determine that the traffics of the ports P1 and P2 are greater as the data occupation amounts in the output frame buffers B1 and B2 are greater.

For example, the switch may compare the number of overflows of the output frame buffers B1 and B2 (hereinafter, referred to as overflow number) as the traffics of the ports P1 and P2 in S180. That is, the switch may be configured to determine that the traffics of the ports P1 and P2 are greater as the overflow number in the output frame buffers B1 and B2 are greater.

In S190, the switch refers to the comparison result in S180 to determine whether the traffics of the ports P1 and P2 are the same (i.e., equal to each other). For example, when the difference in traffics of the ports P1 and P2 is within a predetermined range, the switch determines that the traffics of the ports P1 and P2 are equal to each other.

When the switch determines in S190 that the traffics of the ports P1 and P2 are not equal to each other, the processing proceeds to S200. In S200, the switch selects the port having the smallest traffic among the ports P1 and P2 as the port to output the mirror frame. Hereinafter, the port to output the mirror frame may be referred to as an output port. Further, in S200, the switch outputs the mirror frame from the port selected as the output port to transfer the mirror frame to the diagnostic device 23. Thereafter, the switch ends the processing of FIG. 2.

When the switch determines in S190 that the traffics of the ports P1 and P2 are equal to each other, the processing proceeds to S210. In S210, the switch selects the port different from the port transmitting the normal frame among the ports P1 and P2 as the output port to output the mirror frame. Here, the normal frame is a mirroring target frame to be mirrored, in other words, a source frame to be copied. Further, in S210, the switch outputs the mirror frame from the port selected as the output port to transfer the mirror frame to the diagnostic device 23. Thereafter, the switch ends the processing of FIG. 2.

When the switch proceeds from S150 to S170, the switch outputs the normal frame addressed to the node connected to another switch from one of the ports P1 and P2. For example, the switch outputs the normal frame addressed to the node connected to another switch from the port having a smaller number of hops to the destination node among the ports P1 and P2. The "number of hops" referred to here is the number of switches to be relayed.

3. Operation Example

In the communication network 1 of FIG. 1, suppose that, for example, the diagnostic device 23 outputs the port mirroring instruction to the switch 52. Also, suppose that the target indication information included in the port mirroring instruction indicates that the frame from the ECU 16 to the ECU 18 is to be mirrored.

In this case, the port mirroring instruction output from the diagnostic device 23 is input to any of the ports P1 and P2 of the switch 52. The switch 52 determines as "YES" in both S110 and S150 of FIG. 2, and copies the frame to be transferred from the ECU 16 to the ECU 18.

Then, the switch 52 compares the traffics of the ports P1 and P2, and outputs the mirror frame that has been copied from the ports P1 and P2 having the smallest traffic. The mirror frame output from the switch 52 is input to any of the ports P1 and P2 of the switch 51. The switch 51 outputs the received mirror frame from the port P4 connected to the diagnostic device 23.

When the switch 52 determines that the traffics of the ports P1 and P2 are equal to each other, the switch 52 selects, among ports P1 and P2, the port different from the port outputting the normal frame from the ECU 16 to the ECU 18. Then, the switch 52 outputs the mirror frame from the selected port, which is different from the port outputting the normal frame from the ECU 16 to the ECU 18.

For example, when the normal frame from the ECU 16 to the ECU 18 is output from the port P2 of the switch 52 as shown by a dotted line in FIG. 1, the mirror frame is output from the port P1 of the switch 52 and received by the diagnostic device 23 as shown by a dashed-dotted line.

4. Effects

According to the switches 51 to 54 of the embodiment detailed above, the following effects can be obtained.

(1) When receiving the port mirroring instruction transmitted from the diagnostic device 23 connected to another switch, the switch compares the traffics of the redundant ports P1 and P2, and selects the output redundant port to output the mirror frame based on the comparison result. The mirror frame is output to the diagnostic device 23 from the redundant port having less traffic among the redundant ports P1 and P2. As a result, excessive increase of the bandwidth in the transfer path due to the port mirroring is suppressed.

(2) The switch selects the redundant port having the smallest traffic among the redundant ports P1 and P2 as the output redundant port to output the mirror frame. Therefore, the effects of suppressing the excessive increase of the bandwidth in the transfer path are enhanced.

(3) When the switch determines that the traffics of the ports P1 and P2 are equal to each other, the switch selects, among the redundant ports P1 and P2, the redundant port different from the redundant port outputting the normal frame. Therefore, the increase of the bandwidth in the transfer path is suppressed more effectively.

(4) The switch compares the traffics of the redundant ports P1 and P2 based on the data occupation amounts in the output frame buffers B1 and B2. In this case, the traffics are compared more easily.

S110 and S150 of the processing of FIG. 2 correspond to a determining unit. S170 corresponds to a copying unit. S180 to S210 correspond to a selecting unit.

For example, the portion of the switch performing the processing of FIG. 2 may be configured by a microcomputer having a CPU and a semiconductor memory (hereinafter, referred to as a memory) such as RAM or ROM. In this case, at least a part of the functions of the switch may be implemented by a CPU executing a program stored in a non-transitory tangible storage medium. In this example, the memory corresponds to the non-transitory tangible storage medium storing the program. In addition, a method corresponding to the program is performed by executing the program.

Alternatively, the portion of the switch performing the processing of FIG. 2 may be implemented by one or more hardware. For example, when the portion of the switch performing the processing of FIG. 2 is implemented by an electronic circuit which is hardware, the electronic circuit may be implemented by a digital circuit, an analog circuit, or a combination thereof.

5. Other Embodiments

Although the embodiment of the present disclosure has been described above, the present disclosure is not limited to the above-described embodiment, and various modifications can be made. For example, the number of ECUs, the number of switches, and the number of ports are examples and other number may be chosen.

For example, in the above embodiment, the connection form (that is, the network topology) of the switches 51 to 54 is a ring type. However, the connection form may be arbitrarily chosen as far as the switches provide a plurality of transfer paths therebetween. The connection form may be a full contact type, a mesh type or the like. For example, when the connection form of the four switches 51 to 54 is the full contact type, the three ports of the switches 51 to 54 correspond to redundant ports, and three transfer paths are formed between the switches 51 to 54. In this case, the switch selects the redundant port having the smallest traffic among the three redundant ports as the output redundant port to output the mirror frame. The redundant port having the second smallest traffic may be selected as the output redundant port to output the mirror frame. That is, the redundant port not having the largest traffic may be selected as the output redundant port to output the mirror frame.

When switches are connected in the ring shape, the number of the redundant ports can be minimized to two. That is, the transfer paths redundantly and reduction of the number of redundant ports can be balanced.

The ports P3 and P4 of the switches 51 to 54 are connected to the ECU or the diagnostic device 23 as the node via another switch. The communication protocol may be a protocol other than Ethernet.

A plurality of functions of one element in the above embodiment may be implemented by a plurality of elements, or one function of one element may be implemented by a plurality of elements. A plurality of functions of a plurality of elements may be implemented by one element, or one function implemented by a plurality of elements may be implemented by one element. A part of the configuration of the above embodiment may be omitted.

In addition to the above-described switch, the present disclosure may be adopted to various forms such as a communication network having the switch as a component, a program for causing the computer to function as the switch, a non-transitory tangible storage medium such as a semiconductor memory storing the program, a transferring method of the mirror frame.

What is claimed is:

1. A relay device usable as one of a plurality of relay devices providing a communication network, each of the plurality of relay devices having a plurality of ports including at least two redundant ports, the at least two redundant ports being connected to communication lines forming redundant transfer paths between the plurality of relay devices, the relay device comprising:
  a determining unit configured to determine whether a port mirroring instruction is received by any of the at least two redundant ports, the port mirroring instruction being transmitted to the relay device from a diagnostic device connected to another one of the plurality of relay devices;
  a copying unit configured to copy a normal frame when the determining unit determines that the port mirroring instruction is received by any of the at least two redundant ports, the normal frame being a mirroring target frame indicated by the port mirroring instruction to be mirrored; and
  a selecting unit configured to:
    compare traffics of the at least two redundant ports when the determining unit determines that the port mirroring instruction is received by any of the at least two redundant ports;
    select an output redundant port to output a mirror frame copied by the copying unit based on a comparison result of the traffics of the at least two redundant ports; and
    output the mirror frame from the output redundant port to transfer the mirror frame to the diagnostic device.

2. The relay device according to claim 1, wherein
  the selecting unit is configured to select, as the output redundant port, a redundant port having a smallest traffic among the at least two redundant ports.

3. The relay device according to claim 2, wherein
  the selecting unit selects, as the output redundant port, a redundant port different from a redundant port outputting the normal frame among the at least two redundant ports when determining that the traffics of the at least two redundant ports are equal to each other.

4. The relay device according to claim 1, wherein the selecting unit is configured to compare the traffics of the at least two redundant ports based on data occupation amounts in output frame buffers that store frames scheduled to be output from the at least two redundant ports.

5. The relay device according to claim 1, wherein the communication network provided by the plurality of relay devices is a communication network of a ring type topology.

* * * * *